Figure 1:
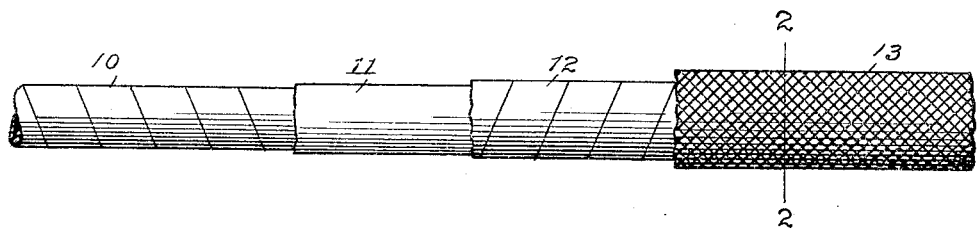

No. 778,666. PATENTED DEC. 27, 1904.
A. J. HOSKINS.
FLEXIBLE CONDUIT.
APPLICATION FILED JULY 1, 1904.

WITNESSES.
H. A. Lamb,
S. W. Atherton

INVENTOR.
Albert J. Hoskins
By A. M. Wooster
Atty.

No. 778,666.                                                                  Patented December 27, 1904.

UNITED STATES PATENT OFFICE.

ALBERT J. HOSKINS, OF SAN FRANCISCO, CALIFORNIA.

FLEXIBLE CONDUIT.

SPECIFICATION forming part of Letters Patent No. 778,666, dated December 27, 1904.

Application filed July 1, 1904. Serial No. 214,914.

*To all whom it may concern:*

Be it known that I, ALBERT J. HOSKINS, a citizen of the United States, residing at San Francisco, county of San Francisco, State of California, have invented a new and useful Flexible Conduit, of which the following is a specification.

My invention has for its object to produce a flexible insulating-conduit for electrical conductors which shall be simple and inexpensive to produce, durable, and thoroughly effective as an insulator of electrical conductors contained therein, the said conduit being adapted to have one or more electrical conductors or wires or piping inserted therein or removed therefrom.

With the above ends in view I have devised the novel flexible conduit, which I will now describe, referring to the accompanying drawings, forming part of this specification and using reference characters to indicate the several parts.

Figure 2:
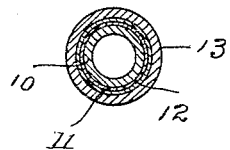

Figure 1 is a view illustrating the manner in which my novel electrical conduit is built up of concentric layers of material, and Fig. 2 is a transverse section on the line 2 2 in Fig. 1.

My novel conduit consists, essentially, of an inner layer 10 of asbestos, a second layer 11, consisting of mica scales, a third layer 12, consisting of a strip of gauze wound spirally in the opposite direction from the asbestos strip, and an outer layer or covering 13, which is braided on in the usual or any preferred manner. The inner layer 10 may be formed by winding a strip of asbestos paper spirally on a mandrel. The second layer consists of mica scales which are applied to the outer side of the asbestos layer and are retained in place in any suitable manner, as by a linseed-oil cement. The size of the scales and the mode of attachment is not of the essence of the invention, the requirement being that the inner asbestos layer be thoroughly covered and perfectly insulated by a mica layer, and the mica being necessarily applied in the form of scales on account of the requirement that the conduit be flexible. When the layer of mica scales has been built up to sufficient thickness, it is secured in place by a third layer or ply, which consists of a strip of gauze (indicated by 12) wound spirally in the opposite direction from the inner layer of asbestos paper. This arrangement of the gauze being wound as described not only protects the mica scales, but increases the strength of the conduit. In other words, the winding of the asbestos in one direction and the gauze in the opposite direction provides a stronger conduit than if both were wound in the same direction, and such winding serves to better retain the mica scales, because the asbestos coils and the gauze coils cannot both open at the same time so as to permit the escape of the mica.

In practice the interior of the conduit is usually covered with mica paint by running mica paint through it, and the gauze layer is likewise covered over with mica paint.

The braided outer layer or cover, as already stated, may be applied in any ordinary or preferred manner.

Having thus described my invention, I claim—

A flexible conduit adapted to receive electrical conductors, said conduit comprising an inner tube consisting of spirally-wound sheet-asbestos, a layer of mica scales secured to the outer surface of said tube, a protecting layer for the mica scales and comprising a strip of gauze wound spirally in the opposite direction from the asbestos strip, and a covering for the gauze-strip layer.

In testimony whereof I affix my signature in presence of two witnesses.

ALBERT J. HOSKINS.

Witnesses:
   A. M. WOOSTER,
   S. W. ATHERTON.